(No Model.)
F. B. MANVILLE.
METHOD OF MAKING LACING STUDS.
No. 525,275. Patented Aug. 28, 1894.
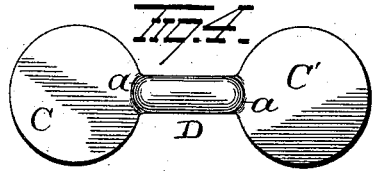
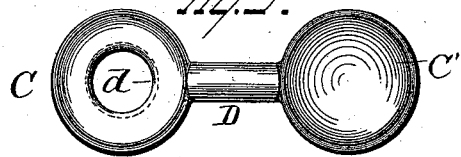
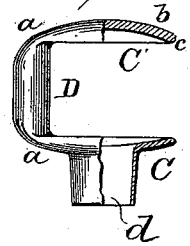
Witnesses
E. Nottingham
G. F. Downing
Inventor
F. B. Manville
By H. A. Seymour
Attorney

UNITED STATES PATENT OFFICE.

FRANK B. MANVILLE, OF WATERBURY, CONNECTICUT, ASSIGNOR TO THE FAST COLOR EYELET COMPANY, OF SPRINGFIELD, MASSACHUSETTS.

METHOD OF MAKING LACING-STUDS.

SPECIFICATION forming part of Letters Patent No. 525,275, dated August 28, 1894.

Application filed January 8, 1894. Serial No. 496,174. (No model.)

*To all whom it may concern:*

Be it known that I, FRANK B. MANVILLE, of Waterbury, in the State of Connecticut, have invented certain new and useful Improvements in Methods of Making Lacing-Studs; and I do hereby declare the following to be a full, clear, and exact description of the invention, such as will enable others skilled in the art to which it appertains to make and use the same.

My invention relates to an improvement in the method of making lacing studs, the object being to produce a lacing stud from a single piece of metal and of such form and construction that the metal will be so disposed as to impart great strength and durability to the finished article; a further object being to produce a cheap and efficient method for the manufacture of my improved lacing stud.

With these objects in view the invention consists in certain novel steps in the manufacture of lacing studs which will be hereinafter described and pointed out in the claims.

In the accompanying drawings, Figures 1, 2, 3, 4 and 5 represent different views of the blank, and Fig. 6 shows the completed article.

In Fig. 1 A represents a short piece of wire preferably steel wire—though it may be brass or any other metal. This blank is placed in any suitable heading machine, and its opposite ends are upset forming thereon the round heads B B, as represented in Fig. 2. The blank is then flattened in a suitable machine to the form illustrated in side elevation in Fig. 3 and plan view in Fig. 4. By reference to Fig. 3 it will be observed that the round ends are flattened to form disks C C' as represented in Fig. 4, while the middle portion or shank D is rounded as at *a a* at which points the ends of the shank merge into the disks C C', the body of the shank being left cylindrical in cross section although if desired it may be slightly flattened. In the process of flattening or if desired by a separate process, the disk C' is not only flattened but is also made slightly concavo convex, giving its outer surface *b* and to its edge *c*, a smooth and finished appearance. From the other disk C is punched out an eyelet *d* of any desired length and diameter as shown in Fig. 5. The disks C C' are then bent by any suitable machine so as to stand at right angles to the shank D, which process completes the article, as illustrated in Fig. 6, excepting of course, it may be afterward polished, plated or japanned. When the disks are bent at right angles to the shank D, it will be observed that the rounded portions *a a* not only allow of such bending without cracking or distorting the metal at the bends, owing to the fact that the thickness of the metal is gradually reduced at the rounded portions so as to facilitate the operation of bending, but such rounded ends of the shank also result in imparting a smooth and finished contour to the finished article.

The lacing stud illustrated in Fig. 6 is provided with a thick and strong shank D which firmly unites disks C C', and retains the latter against being bent out of place, and being formed with a smooth and rounded surface it will not cut or unduly wear the lacing as it is drawn snugly around it in lacing a shoe. By my improved process, there is no waste metal in the manufacture of the article except what little may be punched out of the bottom of the eyelet the blank being manufactured in such a manner that by the successive operations hereinbefore described, the metal comprising a short piece of wire is caused to assume the form of a completed lacing stud.

The article so formed is much stronger and more highly finished than one in which the parts are turned in a lathe, because the successive operations of heading and flattening, operate to consolidate the metal and render it compact and strong, and to give its surface a hard and finished appearance, and furthermore by my improved process I am enabled to make lacing studs of steel, which metal is preferable to brass because japan will adhere more closely thereto, and even though it may after a time be rubbed off, it will not disfigure the article to the extent that it does when made of brass.

As it is evident that slight changes in or variations from the process and the features of form and construction herein shown and described might be resorted to without involving a departure from my invention I would have it understood that I do not restrict myself to the precise steps in the process, form and construction described and shown, but, Having fully described my invention, what I claim as new, and desire to secure by Letters Patent, is—

1. A process for manufacturing lacing studs, consisting in upsetting the ends of the blank and forming enlarged heads thereon, then flattening the heads, and punching an eyelet from one of the flattened disks, and bending such disks at right angles to the shank, substantially as set forth.

2. A process for manufacturing lacing studs comprising the upsetting of the ends of a wire blank and forming rounded heads thereon, flattening the heads and rounding the ends of the shank where they connect with the disks, substantially as set forth.

3. The process of manufacturing lacing studs consisting in forming enlarged heads on the opposite ends of a blank, flattening such heads, punching an eyelet from one of the flattened disks, and bending the disks at right angles to the shank, substantially as set forth.

In testimony whereof I have signed this specification in the presence of two subscribing witnesses.

FRANK B. MANVILLE.

Witnesses:
TRUMAN S. HICKCOX,
FRANKLIN A. TAYLOR.